United States Patent
Hwang

(10) Patent No.: US 12,067,548 B2
(45) Date of Patent: Aug. 20, 2024

(54) INFORMATION PROCESSING SYSTEM, INFORMATION PROCESSING DEVICE, INFORMATION PROCESSING METHOD, AND RECORDING MEDIUM STORING PROGRAM

(71) Applicant: NEC Corporation, Tokyo (JP)

(72) Inventor: Sangwon Hwang, Tokyo (JP)

(73) Assignee: NEC CORPORATION, Tokyo (JP)

( * ) Notice: Subject to any disclaimer, the term of this patent is extended or adjusted under 35 U.S.C. 154(b) by 632 days.

(21) Appl. No.: 17/277,360

(22) PCT Filed: Sep. 18, 2019

(86) PCT No.: PCT/JP2019/036494
§ 371 (c)(1),
(2) Date: Mar. 18, 2021

(87) PCT Pub. No.: WO2020/066775
PCT Pub. Date: Apr. 2, 2020

(65) Prior Publication Data
US 2021/0357895 A1 Nov. 18, 2021

(30) Foreign Application Priority Data
Sep. 26, 2018 (JP) .............................. 2018-180808

(51) Int. Cl.
*G06Q 20/00* (2012.01)
*G06Q 10/0631* (2023.01)
(Continued)

(52) U.S. Cl.
CPC ..... *G06Q 20/203* (2013.01); *G06Q 10/06315* (2013.01); *G06Q 10/087* (2013.01);
(Continued)

(58) Field of Classification Search
None
See application file for complete search history.

(56) References Cited

U.S. PATENT DOCUMENTS 7,013,286 B1 * 3/2006 Aggarwal .......... G06Q 30/0225
705/14.26
7,195,157 B2 * 3/2007 Swartz ................... G06K 17/00
235/383
(Continued)

FOREIGN PATENT DOCUMENTS

JP 2004-272442 A 9/2004
JP 2007-206745 A 8/2007
(Continued)

OTHER PUBLICATIONS

Aydin, Goker, and Serhan Ziya. "Pricing promotional products under upselling." Manufacturing & Service Operations Management 10.3 (2008): 360-376. (Year: 2008).*
(Continued)

*Primary Examiner* — Gurkanwaljit Singh

(57) ABSTRACT

Provided is an information processing system that enables a customer to shop efficiently. This information processing system is equipped with at least one server that manages an inventory possessed by a virtual store and a physical store, wherein the server uses article identification information capable of uniquely identifying an article to manage the inventory. The server receives a reservation or purchase of an article from a customer terminal. The server then transmits an instruction for displaying, on an electronic tag that is attached to an article and corresponds to received article identification information, an indicator that the article has been reserved or purchased.

6 Claims, 14 Drawing Sheets

(51) Int. Cl.
  *G06Q 10/087* (2023.01)
  *G06Q 20/20* (2012.01)
  *G06Q 30/0207* (2023.01)
  *G06Q 30/0235* (2023.01)
  *G06Q 30/0601* (2023.01)

(52) U.S. Cl.
  CPC ....... *G06Q 20/208* (2013.01); *G06Q 30/0222* (2013.01); *G06Q 30/0235* (2013.01); *G06Q 30/0623* (2013.01); *G06Q 30/0633* (2013.01)

(56) References Cited

U.S. PATENT DOCUMENTS

| | | | | |
|---|---|---|---|---|
| 7,231,357 B1* | 6/2007 | Shanman | ............. | G07G 1/0036 705/14.23 |
| 7,904,333 B1* | 3/2011 | Perkowski | .......... | H04L 61/4557 705/14.73 |
| 8,694,384 B2* | 4/2014 | Bodeman | ........... | G06Q 30/0611 705/26.1 |
| 9,881,289 B2* | 1/2018 | Cummins | .......... | G06Q 30/0222 |
| 10,121,135 B1* | 11/2018 | Foroohar | ............. | G06Q 20/321 |
| 10,318,569 B1* | 6/2019 | Funk | .................. | G06Q 30/3278 |
| 10,482,457 B2* | 11/2019 | Poole | .................. | G06Q 20/382 |
| 11,756,080 B1* | 9/2023 | Viswanath | .......... | H04L 63/0428 705/15 |
| 2001/0014868 A1* | 8/2001 | Herz | .................. | G06Q 30/0269 705/26.1 |
| 2002/0156688 A1* | 10/2002 | Horn | ...................... | G06Q 30/06 705/28 |
| 2003/0132298 A1* | 7/2003 | Swartz | ............... | G06Q 20/3276 235/472.02 |
| 2004/0093281 A1* | 5/2004 | Silverstein | ............ | G06Q 20/04 705/26.8 |
| 2005/0222865 A1* | 10/2005 | Fox | .................... | G06Q 30/0272 705/28 |
| 2007/0124216 A1* | 5/2007 | Lucas | .................... | G06Q 30/02 705/26.1 |
| 2008/0052198 A1 | 2/2008 | Hosokawa | | |
| 2009/0240518 A1* | 9/2009 | Borom | ............... | G06Q 30/0601 705/14.1 |
| 2011/0137747 A1* | 6/2011 | Sapin Bodeman | ......................... G06Q 30/0611 705/26.4 | |
| 2012/0005016 A1* | 1/2012 | Graff | .................. | G06Q 30/0641 709/219 |
| 2014/0095302 A1* | 4/2014 | Monteverde | ....... | G06Q 30/0261 705/14.58 |
| 2014/0207680 A1* | 7/2014 | Rephlo | ................ | H04B 5/0062 705/44 |
| 2014/0279294 A1* | 9/2014 | Field-Darragh | ... | G06Q 30/0282 705/28 |
| 2015/0046240 A1* | 2/2015 | Moreton | ............ | G06Q 30/0225 705/14.17 |
| 2015/0051960 A1* | 2/2015 | Barbaria | ............ | G06Q 30/0215 705/14.17 |
| 2015/0127444 A1* | 5/2015 | Doha | .................. | G06Q 30/0223 705/14.24 |
| 2015/0161643 A1* | 6/2015 | Randell | .............. | G06Q 30/0235 705/14.26 |
| 2015/0206165 A1* | 7/2015 | Cummins | .......... | G06Q 30/0222 705/14.23 |
| 2015/0220942 A1* | 8/2015 | Dubberley | ......... | G06Q 30/0201 705/7.29 |
| 2016/0189191 A1* | 6/2016 | Spalding | ............ | G06Q 30/0276 705/14.23 |
| 2019/0228461 A1* | 7/2019 | Domokos | .......... | G06Q 30/0201 |
| 2019/0272557 A1* | 9/2019 | Smith | .................. | G06Q 10/087 |

FOREIGN PATENT DOCUMENTS

| | | |
|---|---|---|
| JP | 2008-272012 A | 11/2008 |
| JP | 2011-123711 A | 6/2011 |
| JP | 2012-053811 A | 3/2012 |
| JP | 2014-056356 A | 3/2014 |
| JP | 2015-210723 A | 11/2015 |

OTHER PUBLICATIONS

Iyer, Ananth V., and Jianming Ye. "Assessing the value of information sharing in a promotional retail environment." Manufacturing & Service Operations Management 2.2 (2000): 128-143. (Year: 2000).*

Wu, Jianghua, Ling Li, and Li Da Xu. "A randomized pricing decision support system in electronic commerce." Decision Support Systems 58 (2014): 43-52. (Year: 2014).*

Guo, Xiaolong, et al. "Optimal pricing strategy based on market segmentation for service products using online reservation systems: An application to hotel rooms." International Journal of Hospitality Management 35 (2013): 274-281. (Year: 2013).*

International Search Report for PCT Application No. PCT/JP2019/036494, mailed on Dec. 3, 2019.

English translation of Written opinion for PCT Application No. PCT/JP2019/036494, mailed on Dec. 3, 2019.

Shigaku Iwabuchi et al., "Sales box that synchronizes e-commerce and real-world purchasing context", The 25th Workshop on Interactive Systems and Software, Dec. 11, 2017, Internet: <URL:http://www.wiss.org/WISS2017Proceedings/demo/2-A03.pdf>.

Japanese Office Action for JP Application No. 2020-548538 mailed on Apr. 12, 2022 with English Translation.

* cited by examiner

Fig.3

| ARTICLE IDENTIFICATION INFORMATION | ARTICLE INFORMATION | | | |
|---|---|---|---|---|
| | INVENTORY MANAGEMENT INFORMATION | TRADE NAME | PRICE | RESERVATION/ PURCHASE FLAG |
| 1-12345-12345 | 0001 | RICE BALL WITH PICKLED PLUM | 120 YEN | PURCHASED |
| 1-12345-12346 | 0001 | RICE BALL WITH PICKLED PLUM | 120 YEN | |
| 1-12345-12347 | 0002 | RICE BALL WITH SALTED SALMON | 150 YEN | |
| ... | ... | ... | ... | |

3000, 4000

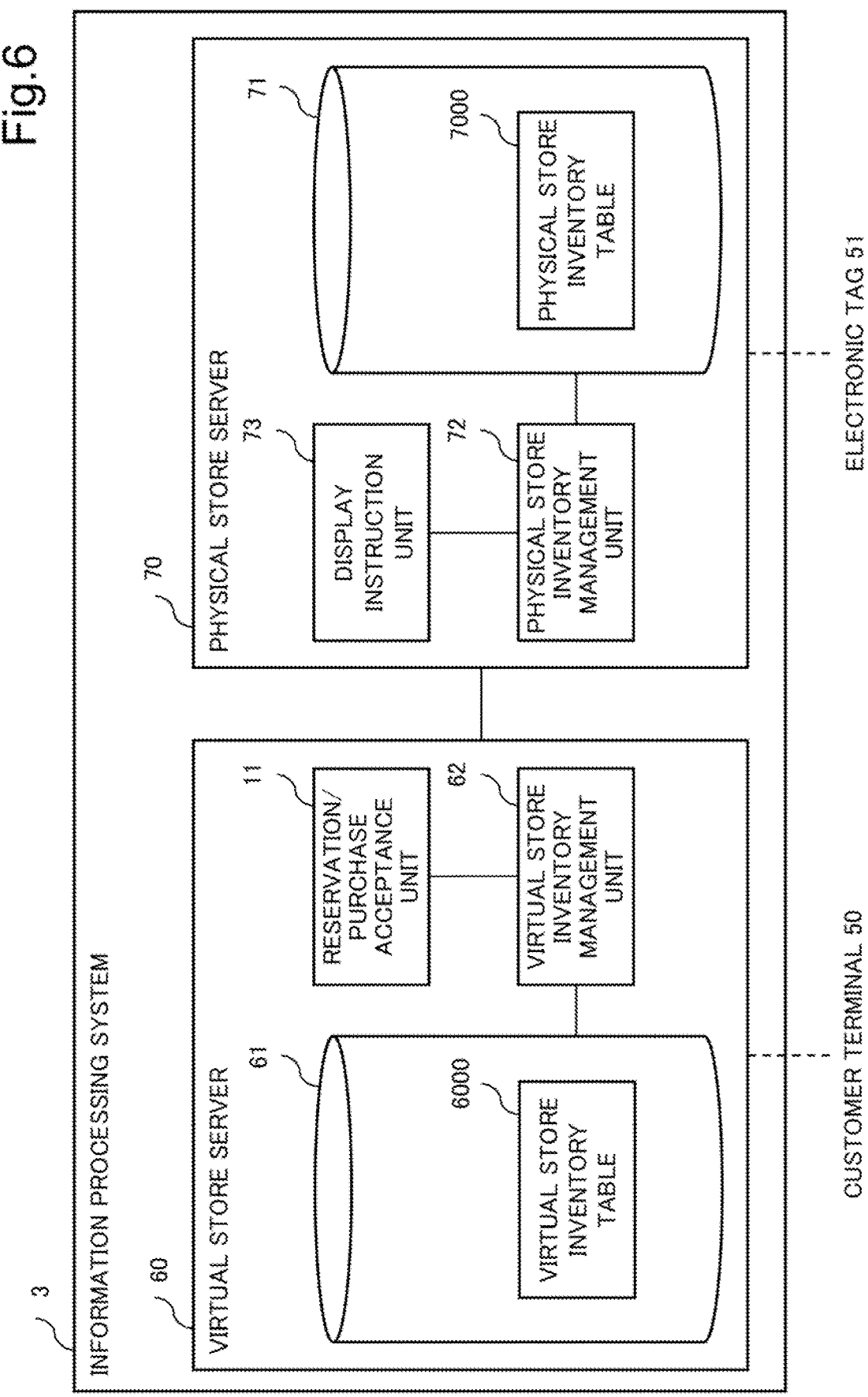

Fig.7

| ARTICLE IDENTIFICATION INFORMATION | INVENTORY MANAGEMENT INFORMATION | ARTICLE INFORMATION ||||| RESERVATION/ PURCHASE FLAG |
|---|---|---|---|---|---|---|---|
| | | TRADE NAME | PRICE | DISPOSAL TIME | DISCOUNT TIMING | DISCOUNT INFORMATION | |
| 1-12345-12345 | 0001 | RICE BALL WITH PICKLED PLUM | 120 YEN | 13:00 | 9:00 | 10% DISCOUNT | |
| | | | | | 10:00 | 20% DISCOUNT | |
| | | | | | 11:00 | 30% DISCOUNT | |
| 1-12345-12346 | 0001 | RICE BALL WITH PICKLED PLUM | 120 YEN | 21:00 | 18:00 | 20% DISCOUNT | |
| | | | | | 19:00 | 30% DISCOUNT | |
| | | | | | 20:00 | 40% DISCOUNT | |
| 1-12345-12347 | 0002 | RICE BALL WITH SALTED SALMON | 150 YEN | 13:00 | 10:00 | 20% DISCOUNT | |
| | | | | | 11:00 | 30% DISCOUNT | |
| | | | | | 12:00 | 40% DISCOUNT | |
| ... | ... | ... | ... | ... | ... | ... | |

6000, 7000

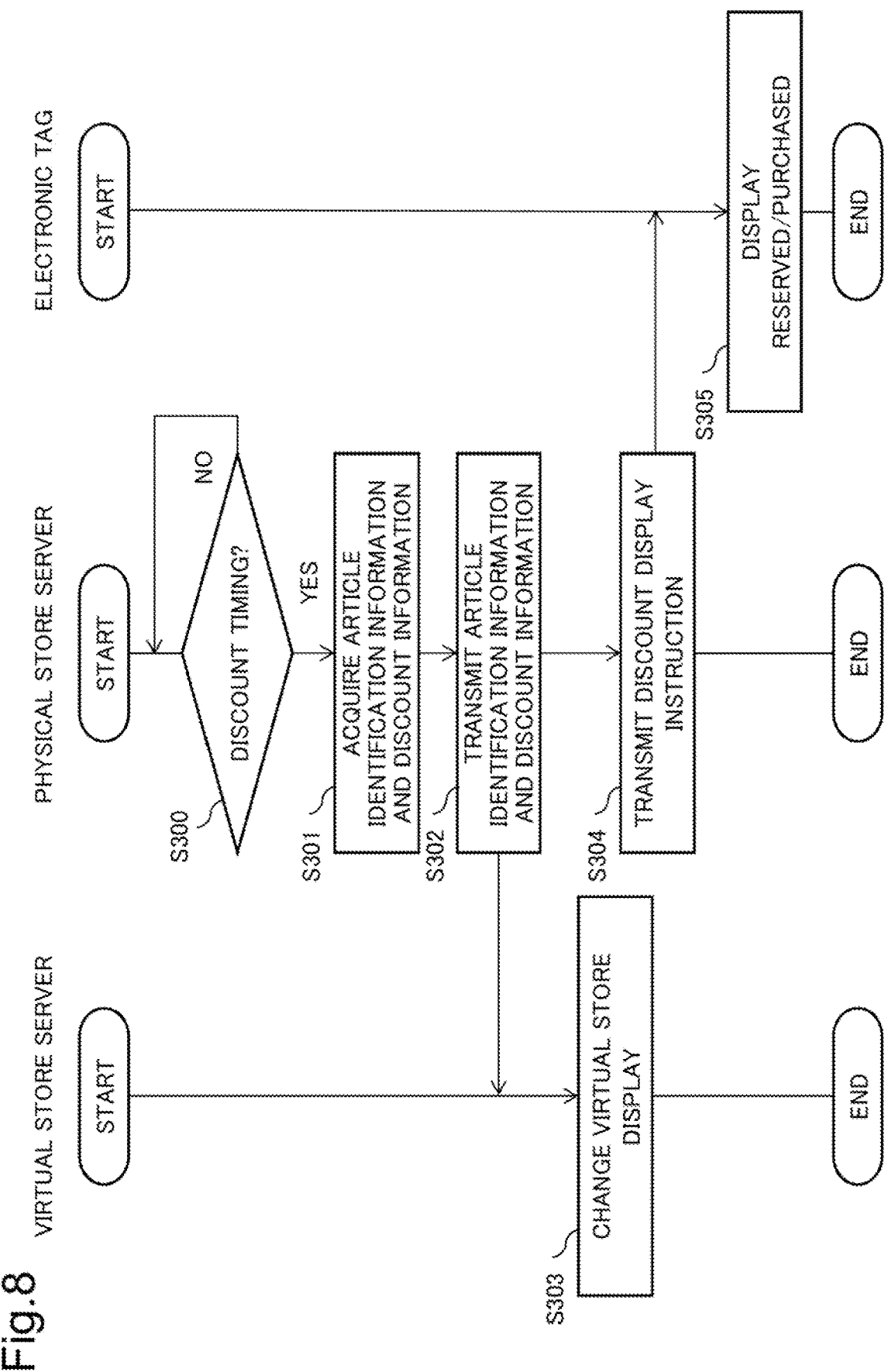

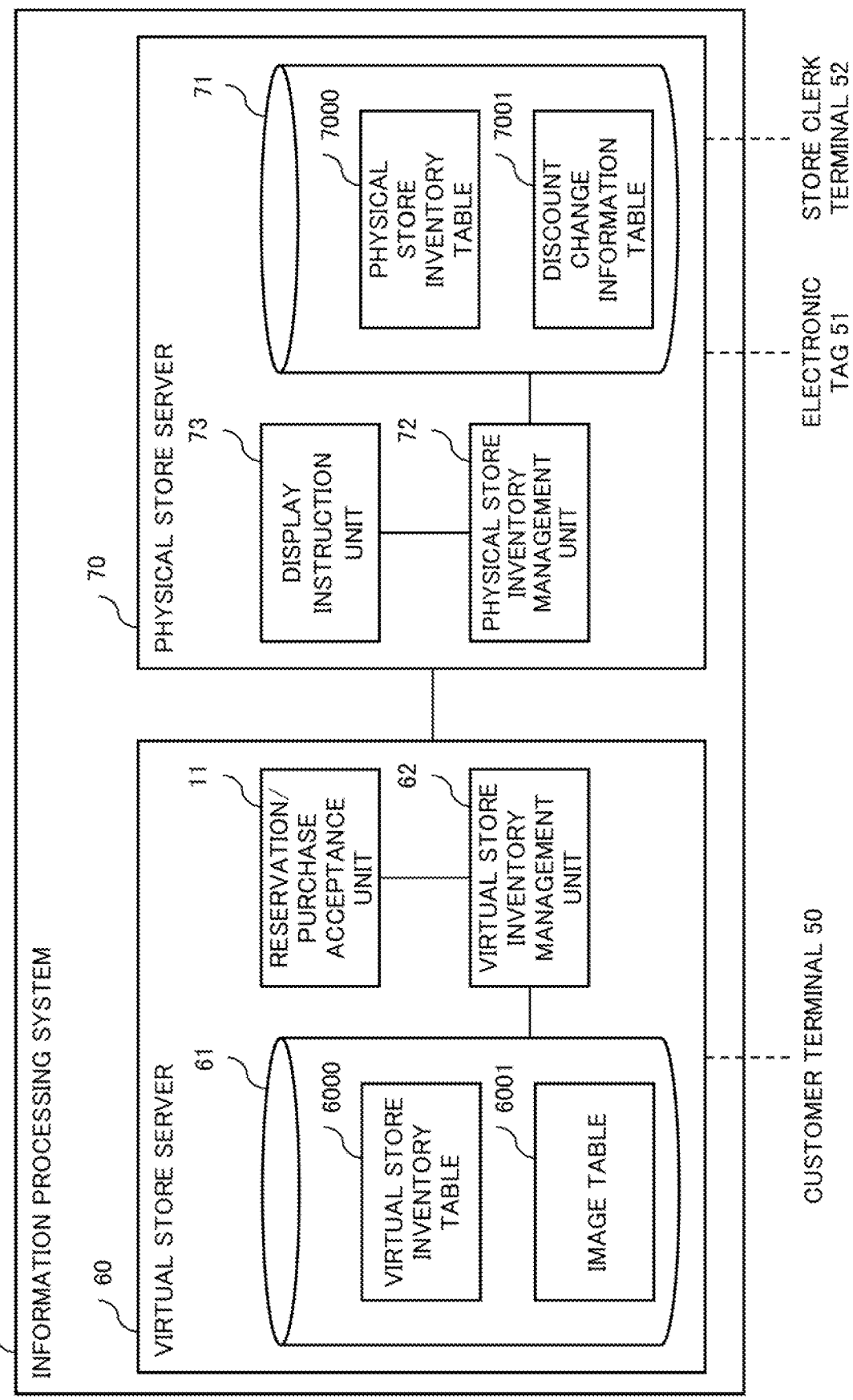

Fig.10

| ARTICLE IDENTIFICATION INFORMATION | DISCOUNT CHANGE CONDITION | DISCOUNT CHANGE INFORMATION |
|---|---|---|
| 1-12345-12345 | NUMBER OF CUSTOMERS IN THE PAST > NUMBER OF CUSTOMERS OF THE DAY | ADVANCE DISCOUNT TIMING BY ONE HOUR |
| 1-12345-12347 | NUMBER OF CUSTOMERS IN THE PAST > NUMBER OF CUSTOMERS OF THE DAY | ADDITIONAL 10% DISCOUNT |
| ... | ... | ... |

| ARTICLE IDENTIFICATION INFORMATION | INVENTORY MANAGEMENT INFORMATION | TRADE NAME | ARTICLE IMAGE |
|---|---|---|---|
| 1-12345-12345<br>1-12345-12346 | 001 | RICE BALL WITH PICKLED PLUM | ▲ PICKLED PLUM |
| 1-12345-12347 | 002 | RICE BALL WITH SALTED SALMON | ▲ SALTED SALMON |
| ... | ... | ... | ... |

6001

INFORMATION PROCESSING SYSTEM, INFORMATION PROCESSING DEVICE, INFORMATION PROCESSING METHOD, AND RECORDING MEDIUM STORING PROGRAM

This application is a National Stage Entry of PCT/JP2019/036494 filed on Sep. 18, 2019, which claims priority from Japanese Patent Application JP2018-180808 filed on Sep. 26, 2018, the contents of all of which are incorporated herein by reference, in their entirety.

TECHNICAL FIELD

The present disclosure relates to an information processing system and the like.

BACKGROUND ART

A retail store such as a supermarket may have a virtual store to trade articles in the physical store on a web (world wide web) site as well. For example, PTL 1 describes that, for an article for which payment processing is performed to purchase the article at either a physical store or a virtual store, other payment processing is prohibited to prevent erroneous selling of the article under payment processing.

CITATION LIST

Patent Literature

[PTL 1] JP 2011-123711 A
[PTL 2] JP 2004-272442 A

SUMMARY OF INVENTION

Technical Problem

Regarding PTL 1, since the customer cannot know which of the articles displayed in the store is an article that is under payment processing or sold in the virtual store, the customer may not be able to purchase the article even if he/she brings the article to the cash register, resulting in poor efficiency.

An object of the present disclosure is to provide an information processing system that enables customers to shop efficiently.

Solution to Problem

One aspect of an information processing system of the present disclosure includes at least one server that manages inventory possessed by a virtual store and a physical store, the inventory managed by using article identification information capable of uniquely identifying an article, and includes a reservation/purchase acceptance unit that accepts reservation or purchase of the article from a customer terminal and acquires article identification information of the article for which the reservation or purchase has been accepted, and a display instruction unit that causes the fact that the article is reserved or purchased to be displayed on an electronic tag attached to an article displayed in the physical store and associated to the acquired article identification information.

One aspect of an information processing device of the present disclosure is an information processing device that manages inventory possessed by a virtual store and a physical store using article identification information capable of uniquely identifying an article, the information processing device including
 a reservation/purchase acceptance unit that accepts reservation or purchase of the article from a customer terminal and acquires article identification information of the article for which the reservation or purchase has been accepted, and
 a display instruction unit that causes the fact that the article is reserved or purchased to be displayed on an electronic tag attached to an article displayed in the physical store and associated to the acquired article identification information.

One aspect of an information processing method of the present disclosure is an information processing method applied to an information processing system including at least one server that manages inventory possessed by a virtual store and a physical store, the method including
 the server
 managing the inventory by using article identification information capable of uniquely identifying an article,
 accepting reservation or purchase of the article from a customer terminal and acquiring article identification information of the article for which the reservation or purchase has been accepted, and
 causing the fact that the article is reserved or purchased to be displayed on an electronic tag attached to an article displayed in the physical store and associated to the acquired article identification information.

One aspect of a program stored on a recording medium of the present disclosure causes a computer implementing at least one server that manages inventory possessed by a virtual store and a physical store to run:
 processing of managing the inventory by using article identification information capable of uniquely identifying an article;
 processing of accepting reservation or purchase of the article from a customer terminal and acquiring article identification information of the article for which the reservation or purchase has been accepted; and
 processing of causing the fact that the article is reserved or purchased to be displayed on an electronic tag attached to an article displayed in the physical store and associated to the acquired article identification information.

Advantageous Effects of Invention

According to the present disclosure, it is possible to provide an information processing system that enables customers to shop efficiently.

BRIEF DESCRIPTION OF DRAWINGS

FIG. 3 is a diagram showing configurations of a physical store inventory table 4000 and a virtual store inventory table 3000.

FIG. 6 is a functional block diagram showing an information processing system 3 according to a third example embodiment.

FIG. 7 is a diagram showing configurations of a physical store inventory table 7000 and a virtual store inventory table 6000.

FIG. 8 is a diagram showing a flow of operations in the information processing system 3 when a discount timing of an article comes.

FIG. 9 is a functional block diagram showing an information processing system 4 according to the third example embodiment.

FIG. 10 is a diagram showing a configuration of a discount change information table 7001.

FIG. 11 is a diagram showing a configuration of an image table 6001.

EXAMPLE EMBODIMENT

First Example Embodiment

Figure 1:
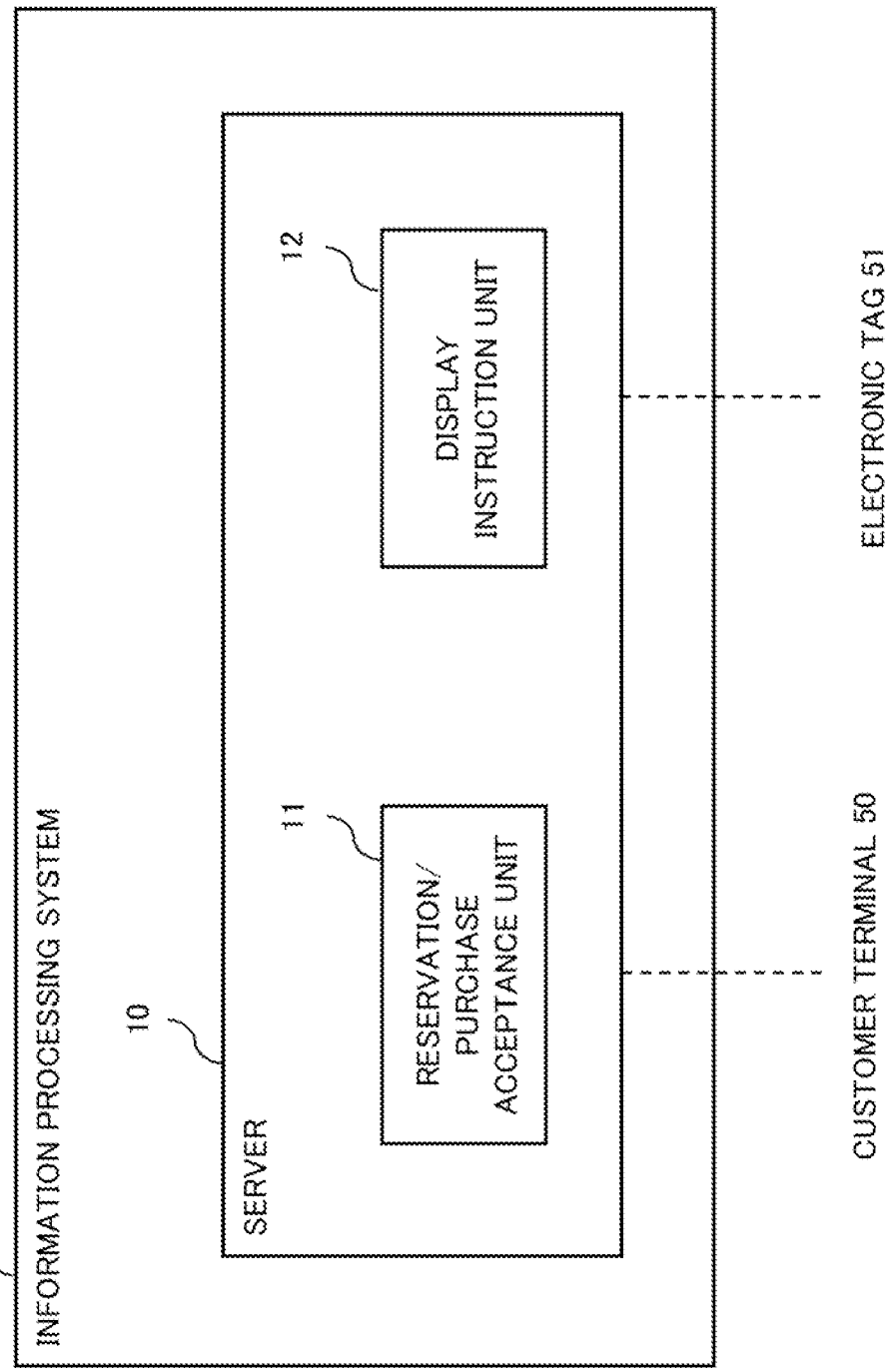
FIG. 1 is a functional block diagram showing a configuration of an information processing system 1 according to a first example embodiment.

FIG. 1 is a functional block diagram showing a configuration of an information processing system 1 according to a first example embodiment. The information processing system 1 includes a server 10 for managing inventory possessed by a virtual store and a physical store.

The server 10 manages inventory by using article identification information capable of uniquely identifying the article. The server 10 includes a reservation/purchase acceptance unit 11 and a display instruction unit 12. The reservation/purchase acceptance unit 11 accepts reservation or purchase of an article from a customer terminal 50, and acquires article identification information of the article whose reservation or purchase has been accepted. The display instruction unit 12 causes the fact that the article is reserved or purchased to be displayed on an electronic tag 51 attached to the article displayed in the physical store and associated to the acquired article identification information.

As described above, according to the present example embodiment, it is possible to allow a customer to shop efficiently by visually outputting the fact that an article is reserved or purchased for an article that is already reserved or purchased in the virtual store among the displayed articles, and informing the customer of the already reserved or purchased article.

Second Example Embodiment

A second example embodiment will be described below.

Figure 2:
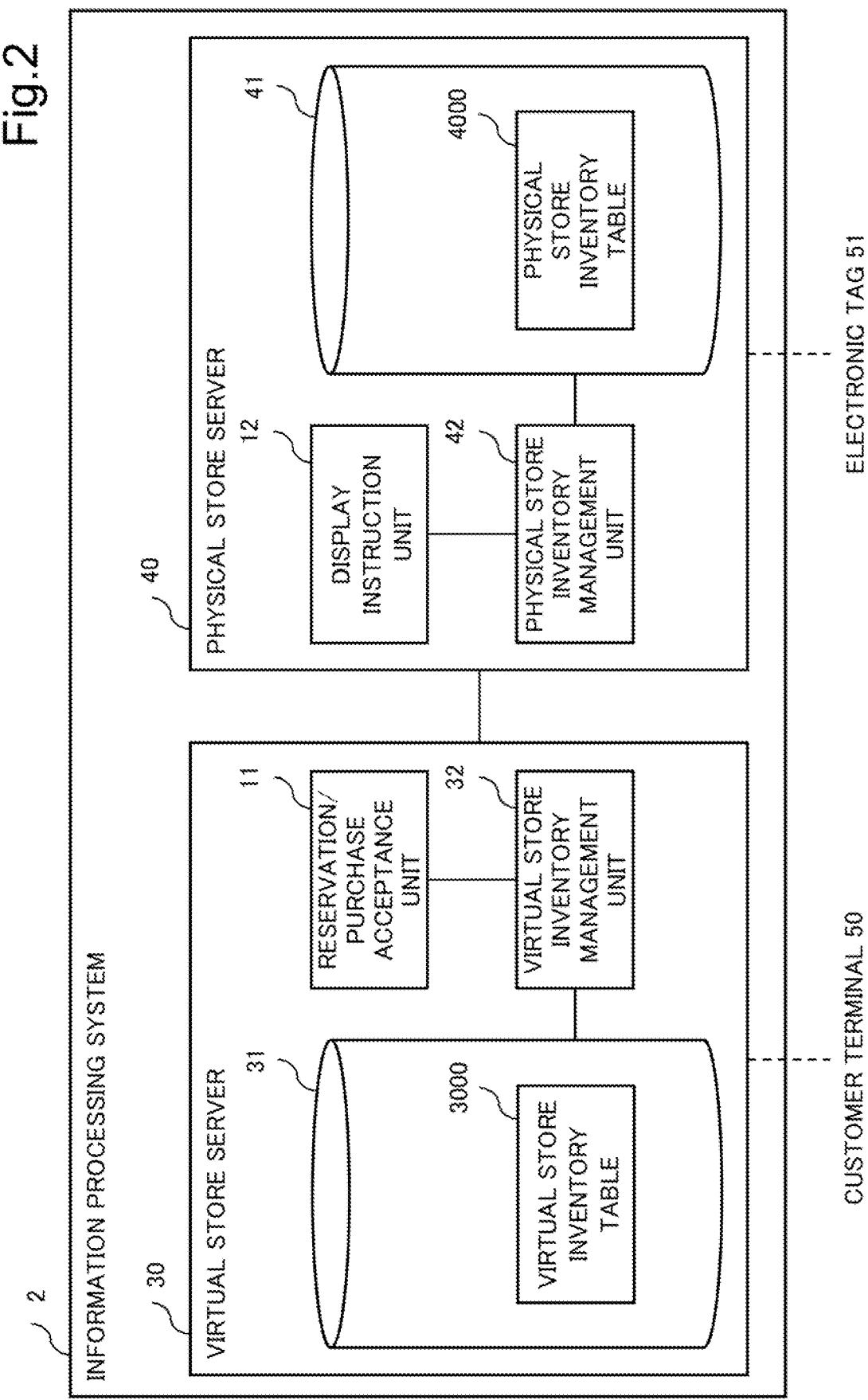
FIG. 2 is a functional block diagram showing a configuration of an information processing system 2 according to a second example embodiment.

FIG. 2 is a functional block diagram showing a configuration of an information processing system 2 according to the second example embodiment. While the information processing system 2 only needs to include at least one server, in the present example embodiment, a case where a physical store server 40 and a virtual store server 30 are provided as servers will be described as an example. The physical store server 40 and the virtual store server 30 are communicatively connected through a network (not shown), and manage articles with an electronic tag 51 displayed in the physical store as inventory. The physical store server 40 is connected to a network in the physical store, and acquires information on the sale of articles and information on the arrival of articles from in-store devices such as a POS (point of sales) terminal (not shown) and a store clerk terminal. The virtual store server 30 is installed outside the physical store and controls the display of the virtual store in accordance with the inventory state. A virtual store is a web site for trading articles in a physical store.

The electronic tag 51 is an electronic device attached to an article and capable of displaying display information such as the price of the article on a display unit (not shown) in accordance with an instruction received from the physical store server 40. The electronic tag 51 includes a storage unit (not shown) for storing display information and a display unit, stores display information included in an instruction received from the physical store server 40 in the storage unit, and displays the display information on the display unit. The electronic tag 51 is attached to the article and stores article identification information. Article identification information can uniquely identify the article and is also used as information for identifying the electronic tag 51. For example, article identification information can identify each of multiple articles whose trade names are "rice ball with pickled plum". Article identification information can also be used as an address when the physical store server 40 transmits a display instruction to the electronic tag 51.

When a customer shops in the virtual store, he/she reserves or purchases an article by using the customer terminal 50 such as a smartphone or a tablet terminal. Reservation refers to a customer's application to reserve an article. Purchase refers to a customer's application to purchase an article and making the payment. The customer terminal 50 accesses the virtual store according to a customer's operation, and displays an article sold in the virtual store by connecting to a web site that trades the article. The customer terminal 50 also performs processing for reserving or purchasing the article according to a customer's operation. In a case where inventory possessed by multiple physical stores is handled in the virtual store, the customer terminal 50 can designate the physical store from which to purchase the article by accepting a customer's operation designating the physical store.

The physical store server 40 is communicatively connected to the electronic tag 51 and the virtual store server 30, and controls the display content of the electronic tag 51 according to the change of inventory information. The physical store server 40 includes a physical store table storage unit 41, a physical store inventory management unit 42, and a display instruction unit 12.

The physical store table storage unit 41 stores a physical store inventory table 4000 that stores inventory information for managing inventory. FIG. 3 is a diagram showing configurations of the physical store inventory table 4000 and a virtual store inventory table 3000. The physical store inventory table 4000 stores article information and a reservation/purchase flag in association with each other as inventory information. Article information includes article identification information, inventory management information, a trade name, and a price. Inventory management information is used to manage the inventory quantity of the article, and is formed of alphanumeric character strings different for each article type, for example. The reservation/purchase flag is a flag indicating that the article is reserved or purchased, and when an article is reserved, the fact that the article has been reserved is stored in the physical store inventory table 4000, and when the article is purchased, the fact that the article has been purchased is stored in the physical store inventory table 4000.

Referring back to FIG. 2, when the virtual store inventory table 3000 is altered, the physical store inventory management unit 42 alters the physical store inventory table 4000 in accordance with the virtual store inventory table 3000. Specifically, when receiving reservation/purchase information from the virtual store server 30, the physical store inventory management unit 42 refers to the physical store inventory table 4000 in accordance with the reservation/purchase information, and adds the reservation/purchase flag to the corresponding article information to alter the physical store inventory table 4000. Reservation/purchase information will be described later.

The display instruction unit 12 instructs the electronic tag 51 to change the display. Specifically, when receiving reservation/purchase information from the virtual store server 30, the display instruction unit 12 generates a reservation/purchase display instruction, which is an instruction for displaying the fact that the article is reserved or purchased, and transmits the reservation/purchase display instruction to the electronic tag 51 storing the article identification information included in the received reservation/purchase information. The reservation/purchase display instruction includes "reserved" or "purchased" as display information to be displayed on the electronic tag 51.

The virtual store server 30 is communicatively connected to the customer terminal 50 and controls the display of the virtual store in accordance with the change of the inventory information. The virtual store server 30 includes a virtual store table storage unit 31, a virtual store inventory management unit 32, and a reservation/purchase acceptance unit 11.

The virtual store table storage unit 31 stores the virtual store inventory table 3000 that stores inventory information for managing inventory. Since the configuration of the virtual store inventory table 3000 is similar to that of the physical store inventory table 4000 described with reference to FIG. 3, description thereof will be omitted.

The virtual store inventory management unit 32 alters the virtual store inventory table 3000 in accordance with reservation or purchase of an article received from the customer terminal 50. Specifically, when accepting reservation or purchase of an article from the customer terminal 50, the virtual store inventory management unit 32 refers to the virtual store inventory table 3000, and alters the virtual store inventory table 3000 by adding the reservation/purchase flag to the article identification information associated to the trade name or inventory management information of the article for which the reservation or purchase has been accepted. The virtual store inventory management unit 32 adds the reservation/purchase flag preferentially to the article identification information having a smaller number, for example.

The virtual store inventory management unit 32 also refers to the virtual store inventory table 3000 for inventory management information that matches the inventory management information of the article for which the reservation or purchase has been accepted, and determines whether the reservation/purchase flag is added to all pieces of inventory management information. If the reservation/purchase flag is added to all pieces of article identification information for articles of one trade name, the virtual store inventory management unit 32 displays the fact that the article is sold out on the display content of the virtual store associated to the article of the trade name for which the reservation or purchase has been accepted. If the reservation/purchase flag is added to all pieces of article identification information, the virtual store inventory management unit 32 may delete the corresponding display content of the virtual store.

When accepting reservation or purchase of an article from the customer terminal 50, the reservation/purchase acceptance unit 11 transmits article identification information of the article for which the reservation or purchase has been accepted to the physical store server 40. Specifically, the reservation/purchase acceptance unit 11 refers to the virtual store inventory table 3000 to acquire the article identification information associated to the trade name or inventory management information of the article for which the reservation or purchase has been accepted. The reservation/purchase acceptance unit 11 preferentially acquires the article identification information having a small number, for example. Then, the reservation/purchase acceptance unit 11 generates reservation/purchase information including the fact that reservation or purchase has been accepted and the article identification information, and transmits the reservation/purchase information to the physical store server 40.

Figure 4:
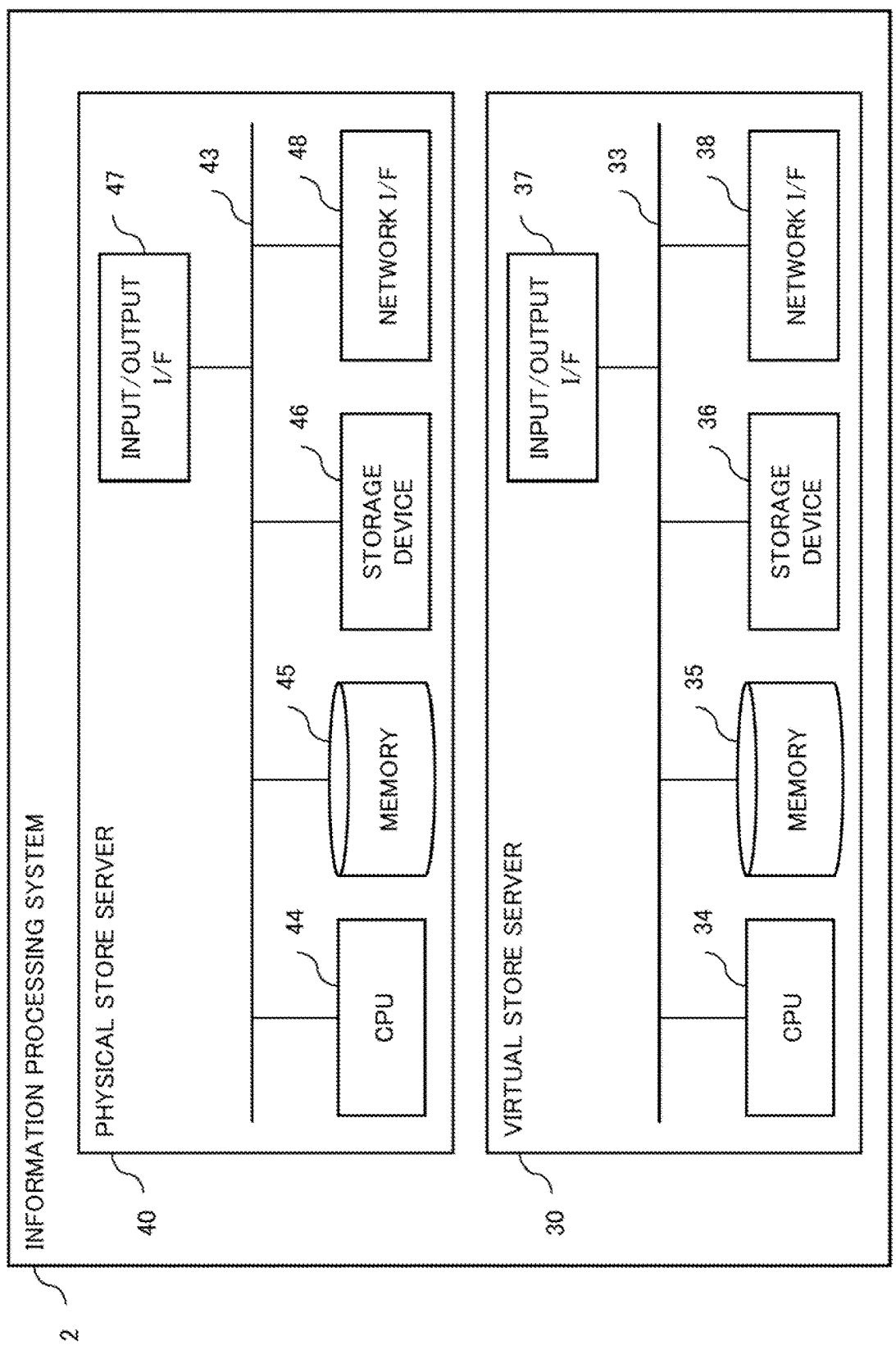
FIG. 4 is a diagram showing a hardware configuration example of the information processing system 2.

FIG. 4 is a diagram showing a hardware configuration example of the information processing system 2. The information processing system 2 shown in FIG. 4 includes the physical store server 40 and the virtual store server 30.

The physical store server 40 includes a bus 43, a CPU (central processing unit) 44, a memory 45, a storage device 46, an input/output interface 47, and a network interface 48.

The bus 43 is a data transmission line through which the CPU 44, the memory 45, the storage device 46, the input/output interface 47, and the network interface 48 transmit and receive data to and from each other.

The memory 45 is a main storage device implemented by a RAM (random access memory), for example. The storage device 46 is an auxiliary storage device implemented by a hard disk, an SSD (solid state drive), a ROM (read only memory), a memory card, or the like. The storage device 46 may be implemented by hardware similar to the hardware used to implement the main storage device such as a RAM.

The storage device 46 stores program modules that implement functions of the physical store server 40. The CPU 44 reads these program modules into the memory 45 and executes them to implement the functions of the functional block diagram shown in FIG. 2.

The input/output interface 47 is an interface for connecting the physical store server and an input device/output device. The input device is a code reader, a keyboard, or a touch panel display, for example, and the output device is electronic paper or a display, for example.

The network interface 48 is an interface for connecting to a communication network such as a WAN (wide area network) or a LAN (local area network).

The virtual store server 30 includes a bus 33, a CPU 34, a memory 35, a storage device 36, an input/output interface 37, and a network interface 38. Since the hardware configuration of the virtual store server 30 is substantially the same as that of the physical store server, the description thereof is omitted.

Operation of Information Processing System

Figure 5:
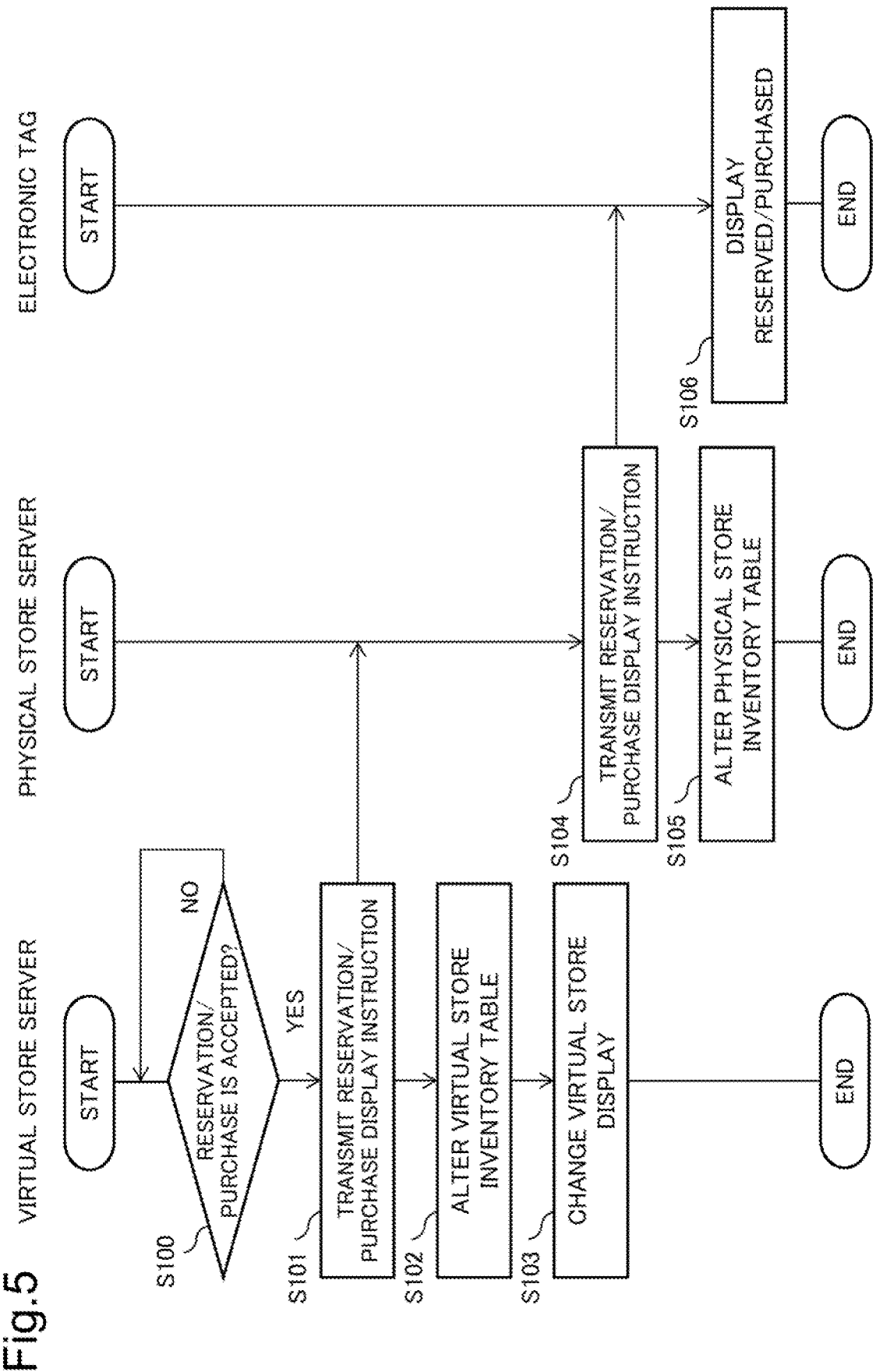
FIG. 5 is a diagram showing a flow of operations in the information processing system 2.

FIG. 5 is a diagram showing a flow of operations in the information processing system 2. The virtual store server 30 waits until accepting a reservation or purchase of an article from the customer terminal 50 (No in step S100), and when accepting a reservation or purchase by receiving a trade name or inventory management information from the customer terminal 50 (Yes in step S100), the reservation/purchase acceptance unit 11 acquires article identification information by referring to the virtual store inventory table 3000, generates reservation/purchase information including the article identification information, and transmits the reservation/purchase information to the physical store server 40 (step S101). Then, the virtual store inventory management unit 32 refers to the virtual store inventory table 3000, and alters the virtual store inventory table 3000 by adding the reservation/purchase flag to the article identification information associated to the trade name or inventory management information of the article for which the reservation or purchase has been accepted (step S102). The virtual store inventory management unit 32 refers to the virtual store inventory table 3000 for the article identification information including the inventory management information that matches the inventory management information of the article for which the reservation or purchase has been accepted, and if the reservation/purchase flag is added to all pieces of article identification information, changes the display of the virtual store by displaying the fact that the article is sold out on the display content associated to the article for which the reservation or purchase has been received (step S103).

The physical store server 40 waits until receiving reservation/purchase information, and when the reservation/purchase information is received, the display instruction unit 12 generates a reservation/purchase display instruction and transmits it to the electronic tag 51 storing the article identification information included in the reservation/purchase information (step S104). Then, the physical store inventory management unit 42 refers to the physical store inventory table 4000, and alters the physical store inventory table 4000 by adding the reservation/purchase flag to the article identification information included in the reservation/purchase information (step S105). The electronic tag 51 waits until receiving a reservation/purchase display instruction, and when the reservation/purchase display instruction is received, display information included in the reservation/purchase display instruction is displayed on a display unit (step S106).

As described above, according to the present example embodiment, since the reservation/purchase display instruction is transmitted to the electronic tag attached to the article reserved or purchased in the virtual store, it is possible to display the fact that the article is reserved or purchased on the electronic tag of the article already reserved or purchased in the virtual store among the displayed articles. Accordingly, it is possible to reduce the possibility of a customer visiting the store mistakenly purchasing an already reserved or purchased article. Also, the store clerk is no longer required to move articles from the display shelf to prevent a customer visiting the store from mistakenly purchasing an article purchased in the virtual store. Hence, it is possible to improve efficiency of the store clerks' work.

The information processing system 2 of the present example embodiment can instead be implemented by one server. Specifically, in a case where the information processing system is implemented by one server, the server of the information processing system is communicatively connected to a customer terminal 50 and an electronic tag 51, and includes a table storage unit, a reservation/purchase acceptance unit, a physical store inventory management unit, a virtual store inventory management unit, and a display instruction unit. The physical store inventory management unit and the virtual store inventory management unit may be provided integrally.

The table storage unit includes a physical store inventory table 4000 and a virtual store inventory table 3000. When accepting reservation or purchase of an article from the customer terminal, the virtual store inventory management unit alters the virtual store inventory table by adding the reservation/purchase flag, and changes or deletes the display content of the virtual store when the article for which the reservation or purchase is accepted is sold out. When accepting reservation or purchase of the article, the reservation/purchase acceptance unit refers to the virtual store inventory table 3000 and acquires article identification information. Then, the reservation/purchase acceptance unit notifies the physical store inventory management unit and the display instruction unit of the acquired article identification information. The physical store inventory management unit adds the reservation/purchase flag to the physical store inventory table in accordance with the article identification information notified from the reservation/purchase acceptance unit. The display instruction unit generates a reservation/purchase display instruction in accordance with the article identification information notified from the reservation/purchase acceptance unit, and transmits the reservation/purchase display instruction to the electronic tag 51 storing the article identification information included in the received reservation/purchase information.

Third Example Embodiment

An information processing system according to a third example embodiment is different from the second example embodiment in that discount information and discount timing are also stored in a physical store inventory table and a virtual store inventory table as article information. Discount timing is the time or time interval at which discount information can be applied. Discount information is information indicating at least either a discount price or a discount rate. Hereinafter, the same configurations as those of the second example embodiment are denoted by the same reference numerals, and description thereof will be omitted.

FIG. 6 is a functional block diagram showing an information processing system 3 according to the third example embodiment. The information processing system 3 includes a physical store server 70 and a virtual store server 60.

The physical store server 70 includes a physical store table storage unit 71, a physical store inventory management unit 72, and a display instruction unit 73. The physical store table storage unit 71 stores a physical store inventory table 7000.

FIG. 7 is a diagram showing configurations of the physical store inventory table 7000 and a virtual store inventory table 6000. The physical store inventory table 7000 stores article information and a reservation/purchase flag in association with each other as inventory management information. In the physical store inventory table 7000, article identification information, inventory management information, trade name, price, disposal time, discount timing, and discount information are stored as article information. In a case where discount timings are stored for one article identification information, multiple pieces of discount information are also stored in association with the discount timings. The disposal time is a time at which the article is disposed of, and is a time at which the freshness date is extended in consideration of the freshness date and the quality deterioration rate, for example. Discount timing and discount information are input in advance by a store clerk.

In the present example embodiment, a case where discount rate is used as discount information will be described as an example.

Returning to the description of FIG. 6, the physical store inventory management unit 72 manages discount information indicating a discount price or a discount rate and a discount timing for each piece of article identification information. Specifically, the physical store inventory management unit 72 refers to the physical store inventory table 7000 to monitor whether it is a discount timing. Then, when a discount timing of an article comes, the physical store inventory management unit 72 transmits the corresponding article identification information and discount information to the virtual store server 60. The physical store inventory management unit 72 transmits the article identification information and discount information whose discount timing has come to the display instruction unit 73 as well.

When receiving the article identification information and discount information whose discount timing has come, the display instruction unit 73 generates a discount display instruction, which is an instruction for displaying the received discount information, and transmits the discount display instruction to an electronic tag 51 storing the article identification information whose discount timing has come. The discount display instruction includes a discount rate or a discount price as display information to be displayed on the electronic tag 51.

The virtual store server 60 includes a virtual store table storage unit 61, a virtual store inventory management unit 62, and a reservation/purchase acceptance unit 11. The virtual store table storage unit 61 stores the virtual store inventory table 6000. Since the configuration of the virtual store inventory table 6000 is similar to that of the physical store inventory table 7000 described with reference to FIG. 7, description thereof will be omitted.

The virtual store inventory management unit 62 manages articles to be displayed in the virtual store and discount information to be displayed in the virtual store. Specifically, when receiving article identification information and discount information from the physical store server 70, the virtual store inventory management unit 62 adds the discount information to the display content of the virtual store associated to the article identification information.

Operation of Information Processing System

FIG. 8 is a diagram showing a flow of operations in the information processing system 3 when a discount timing of an article comes. In FIG. 8, the flow of operations of the information processing system 3 will be described with reference to the previously described physical store inventory table 7000 shown in FIG. 7. In FIG. 8, the physical store inventory management unit 72 of the physical store server 70 refers to the physical store inventory table 7000 to monitor whether it is a discount timing (No in step S300), and when a discount timing comes (Yes in step S300), acquires corresponding article identification information and discount information (Step S301). The physical store inventory management unit 72 transmits the acquired article identification information and discount information to the virtual store server 60 and the display instruction unit 73 (Step S301).

Specifically, the processing of step S301 when the time is 9:00 will be described with reference to FIG. 7. The physical store inventory management unit 72 refers to the physical store inventory table 7000, and at 9:00, acquires "1-12345-12345" as article identification information whose discount timing is 9:00 and "10% discount" as discount information, and transmits the pieces of information to the virtual store server 60 and the display instruction unit 73.

Returning to the description of FIG. 8, when the virtual store server 60 receives the article identification information and discount information, the virtual store inventory management unit 62 changes the display of the virtual store by adding the discount information to the display content associated to the received article identification information (step S303).

Specifically, the processing of step S303 will be described with reference to FIG. 7. The virtual store inventory management unit 62 refers to the virtual store inventory table 6000 and acquires "0001" which is inventory management information associated to "1-12345-12345" received as article identification information. The virtual store inventory management unit 62 adds "10% discount" as discount information to the display content of the virtual store associated to the acquired inventory management information and displays the information. At this time, the virtual store inventory management unit 62 may refer to the virtual store inventory table 6000, count the pieces of article identification information to which the same inventory management information is attached and having the same discount timing, and display the inventory quantity of the discounted article together with the discount information.

Returning to the description of FIG. 8, the display instruction unit 73 having received the article identification information and the discount information generates a discount display instruction, and transmits the discount display instruction to the electronic tag 51 storing the article identification information whose discount timing has come (Step S304). Specifically, the display instruction unit 73 generates a discount display instruction including "10% discount" as the display information to be displayed on the electronic tag 51, and transmits the discount display instruction to the electronic tag 51 storing "1-12345-12345" as article information. When receiving the discount display instruction, the electronic tag 51 displays discount information on a display unit (Step S305).

As described above, according to the present example embodiment, since the discount rate or discount price can be displayed on the electronic tag in accordance with the discount timing, the store clerk is no longer required to check the discount timing and affix a discount sticker or the like to the article. Hence, it is possible to improve efficiency of the store clerks' work.

Moreover, in the present example embodiment, the physical store server 70 can change the discount information and discount timing for each piece of article identification information in accordance with environmental information. Environmental information is information indicating the environment inside and outside the physical store, and includes the number of customers, event, day of the week, or weather, for example. In the present example embodiment, a case where the number of customers is environmental information will be described as an example. In the present example embodiment, since the discount information and discount timing can be managed in accordance with environmental information, when the number of customers of the day is smaller than the number of customers in the past, the probability of a customer purchasing an article can be increased by advancing the discount timing or increasing the discount rate, for example.

FIG. 9 is a functional block diagram showing an information processing system 4 according to the third example embodiment. The information processing system 4 is different from the information processing system 3 in that a physical store server 70 is communicatively connected to a store clerk terminal 52, a physical store table storage unit 71 of the physical store server 70 further includes a discount change information table 7001, and a virtual store table storage unit 61 of a virtual store server 60 further includes an image table 6001.

The store clerk terminal 52 is a terminal operated by a store clerk at the time of stocking. When the store clerk terminal 52 reads article identification information from an electronic tag 51, the store clerk terminal 52 transmits the article identification information to the physical store server 70. Specifically, the article identification information is read by a bar code reader when a bar code or the like associated to the article identification information is displayed on the electronic tag 51, and is read by an RFID (radio frequency identifier) reader when an RFID tag storing the article identification information is built into the electronic tag 51.

FIG. 10 is a diagram showing a configuration of the discount change information table 7001. The discount change information table 7001 stores article identification information, a discount change condition, and discount change information in association with one another. The discount change information table 7001 stores, as a discount change condition, the relationship between the number of customers of the day and in the past. The discount change condition is a condition for changing the discount information or discount timing, and is information such as "number of customers in the past>number of customers of the day", for example. The discount change information is determined by the discount change condition, and is information used to change the discount timing or discount information, such as "advance discount timing by one hour" or "additional 10% discount". The discount change condition and discount change information are input in advance by a store clerk. While the discount change information table 7001 stores the discount change condition and discount change information in association with each piece of article identification information, it is also possible to store the discount change condition and discount change information in association with each piece of inventory management information.

FIG. 11 is a diagram showing a configuration of the image table 6001. The image table 6001 is a table in which article identification information, inventory management information, trade name, and article image are associated with one another.

Returning to the description of FIG. 9, a physical store inventory management unit 72 of the physical store server 70 manages the discount information and discount timing for each piece of article identification information in accordance with environmental information. Specifically, the operation of the physical store inventory management unit 72 will be described for two cases: a case where the physical store inventory management unit 72 receives article identification information from the store clerk terminal 52; and a case where the physical store inventory management unit 72 receives article identification information from a POS terminal installed in the physical store.

First, the case where the physical store inventory management unit 72 receives article identification information from the store clerk terminal 52 will be described. When receiving article identification information from the store clerk terminal 52, the physical store inventory management unit 72 refers to an article information table (not shown) in which a record of the time when the article is ordered or article information of the article handled in the physical store is stored in advance, and acquires article information.

The physical store inventory management unit 72 also refers to the discount change information table 7001 to acquire a discount change condition.

Then, the physical store inventory management unit 72 compares the number of customers of the day with the number of customers in the past, and determines whether the comparison result satisfies the discount change condition. The number of customers of the day is obtained by referring to a table (not shown) storing the number of accounting processes of the day in the POS terminal, and indicates the number of accounting processes processed by the POS terminal by a predetermined time from when the store was opened on the day. The number of customers in the past is obtained by referring to a table (not shown) storing the number of past accounting processes in the POS terminal, and indicates the number of accounting processes processed by the POS terminal by a predetermined time from when the store was opened on a past day such as the previous day. The predetermined time is, for example, a preset time or a time when the physical store inventory management unit 72 receives the article identification information from the store clerk terminal 52. The same time is used as the predetermined time for the day and the past day. The physical store inventory management unit 72 may instead acquire the number of customers of the day and in the past by counting customers appearing on a video of a monitoring camera installed in the physical store.

If the comparison result satisfies the discount change condition, the physical store inventory management unit 72 changes the article information in accordance with the discount change information of the discount change information table 7001, and adds the changed article information to a physical store inventory table 7000. If the comparison result does not satisfy the discount change condition, the physical store inventory management unit 72 adds the article information to the physical store inventory table 7000. The physical store inventory management unit 72 generates table alteration information instructing alteration of a virtual store inventory table 6000 in accordance with the change of the physical store inventory table 7000, and transmits the table alteration information to the virtual store server 60.

Next, the case where the physical store inventory management unit 72 receives article identification information from the POS terminal will be described. When an article is sold in the physical store, the physical store inventory management unit 72 receives article identification information of the sold article from the POS terminal, and alters the physical store inventory table 7000 by adding the fact that the article is purchased as a reservation/purchase flag to the received article identification information. Then, the physical store inventory management unit 72 generates table alteration information and transmits the table alteration information to the virtual store server 60.

A virtual store inventory management unit 62 of the virtual store server 60 alters the virtual store inventory table 6000 in accordance with the table alteration information received from the physical store server 70. Then, the virtual store inventory management unit 62 changes the display content of the virtual store in accordance with the change of the virtual store inventory table 6000.

Operation of Information Processing System

Figure 12:
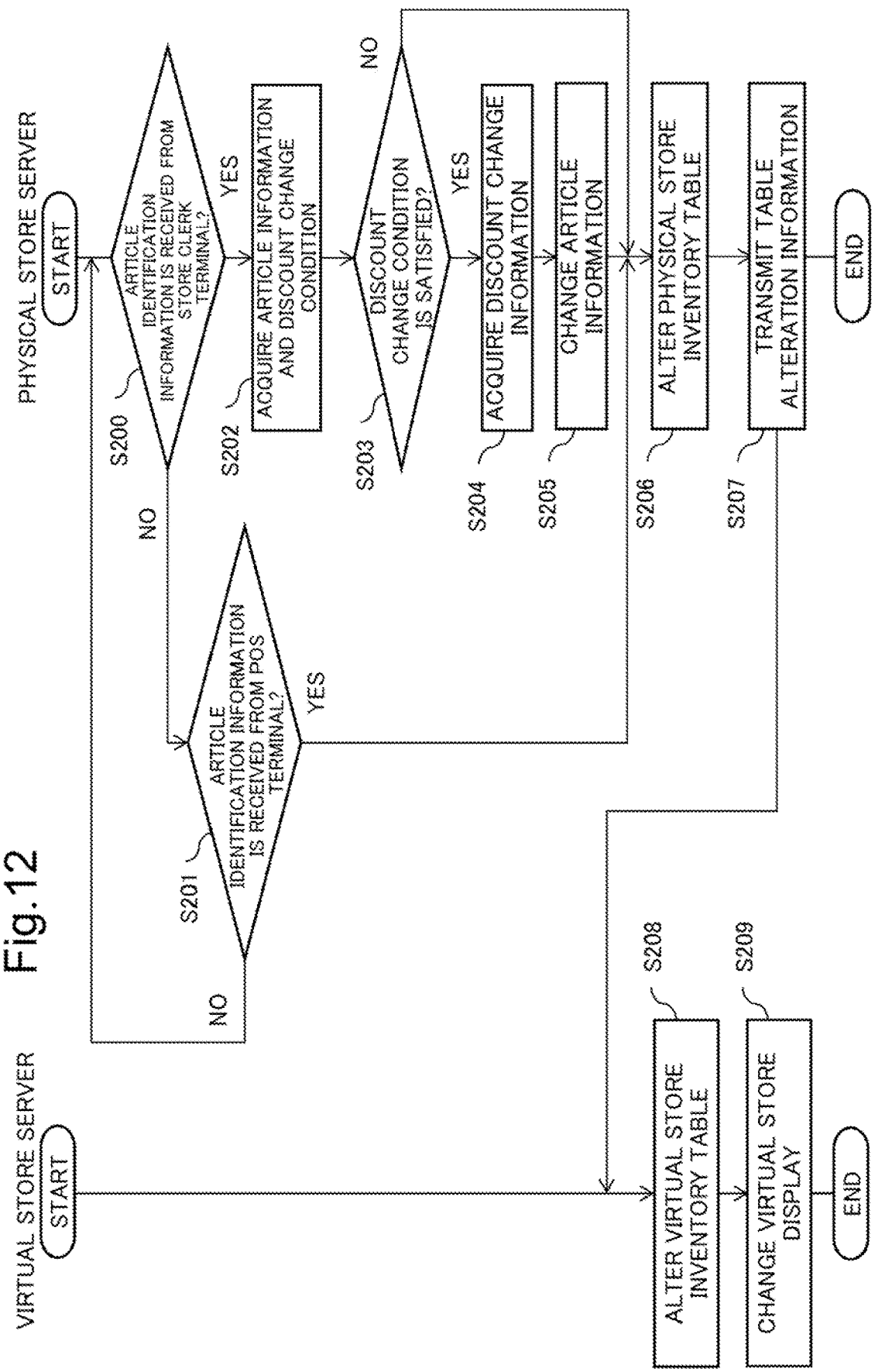
FIG. 12 is a diagram showing a flow of operations in the information processing system 4 in a case where a physical store inventory management unit 72 receives article identification information from a store clerk terminal 52 and in a case where the physical store inventory management unit 72 receives article identification information from a POS terminal.

FIG. 12 is a diagram showing a flow of operations in the information processing system 4 in the case where the physical store inventory management unit 72 receives article identification information from the store clerk terminal 52 and in the case where the physical store inventory management unit 72 receives article identification information from the POS terminal. In FIG. 12, the flow of operations of the information processing system 4 will be described with reference to the physical store inventory table 7000 shown in FIG. 7, the discount change information table 7001 shown in FIG. 10, and the image table 6001 shown in FIG. 11 which have been described previously.

In FIG. 12, when the physical store server 70 receives article identification information from the store clerk terminal 52 (Yes in step S200), the physical store inventory management unit 72 acquires the article information and discount change condition associated to the article identification information (Step S202).

When receiving the article identification information of the sold article from the POS terminal (No in step S200 and Yes in step S201), the physical store server 70 proceeds to step S206. The physical store server 70 waits until receiving the article identification information from the store clerk terminal 52 or the POS terminal (No in steps S200 and S201).

When acquiring the article information and discount change condition in step S202, the physical store inventory management unit 72 compares the number of customers of the day with the number of customers in the past. The physical store inventory management unit 72 determines whether the comparison result satisfies the discount change condition, and if the comparison result satisfies the discount change condition (Yes in step S203), refers to the discount change information table 7001 to acquire discount change information (Step S204). Then, the physical store inventory management unit 72 applies the acquired discount change information to the article information to change the article information (Step S205).

Specifically, in a case where the physical store server 70 receives "1-12345-12345" as article identification information from the store clerk terminal 52 in step S200 and the number of customers of the day is smaller than the number of customers in the past, for example, the processing of steps S202 to S205 will be described with reference to FIGS. 7 and 10. In step S202, the physical store inventory management unit 72 refers to the record when the article is ordered or the article information table, and acquires article information associated to the received article identification information. Here, assume that the discount timings of the acquired article information are set to 10:00, 11:00 and 12:00. In step S202, the physical store inventory management unit 72 refers to the discount change information table 7001 and acquires a discount change condition of "number of customers in the past>number of customers of the day".

Since the case where the number of customers of the day is smaller than the number of customers in the past is used as an example, the physical store inventory management unit 72 determines that the acquired discount change condition "number of customers in the past>number of customers of the day" is satisfied, and Yes is selected in step S203. In step S204, the physical store inventory management unit 72 refers to the discount change information table 7001 and acquires discount change information of "advance discount timing by one hour". Then, the physical store inventory management unit 72 advances the discount timing of the article information acquired in step S201 by one hour, and changes the discount timing to the times 9:00, 10:00, and 11:00.

Returning to the description of FIG. 12, if the comparison result does not satisfy the discount change condition (No in step S203), the processing proceeds to step S206. The physical store inventory management unit 72 alters the physical store inventory table 7000 (step S206), and transmits table alteration information to the virtual store server 60 (step S207).

Steps S206 to S207 will be described specifically in three cases. First, in step S201, when the physical store server 70 receives article identification information from the POS terminal, in step S206, the physical store inventory management unit 72 alters the physical store inventory table 7000 by adding the fact that the article is purchased as a reservation/purchase flag to the received article identification information. Then, in step S207, the physical store inventory management unit 72 transmits, to the virtual store server 60, table alteration information including the article identification information received from the POS terminal and instructing addition of the fact that the article is purchased as the reservation/purchase flag to the article identification information in the virtual store inventory table 6000.

Next, when the article information is changed in step S205, in step S206, the physical store inventory management unit 72 alters the physical store inventory table 7000 by adding the changed article information to the physical store inventory table 7000. Then, in step S207, the physical store inventory management unit 72 transmits, to the virtual store server 60, table alteration information which includes the changed article information and is an instruction for adding the changed article information to the virtual store inventory table 6000.

Finally, if the comparison result does not satisfy the discount change condition in step S203, in step S206, the physical store inventory management unit 72 alters the physical store inventory table 7000 by adding the acquired article information to the physical store inventory table 7000. Then, in step S207, the physical store inventory management unit 72 transmits, to the virtual store server 60, table alteration information which includes the added article information and is an instruction for adding the added article information to the virtual store inventory table 6000.

When the virtual store server 60 receives the table alteration information, the virtual store inventory management unit 62 alters the virtual store inventory table 6000 in accordance with the table alteration information (Step S208). Then, the virtual store inventory management unit 62 changes the display of the virtual store in accordance with the change of the virtual store inventory management unit (Step S209).

Steps S208 to S209 will be described specifically. First, if the table alteration information received in step S208 includes an instruction for adding the fact that the article is purchased as a reservation/purchase flag to the article identification information, in step S208, the virtual store inventory management unit 62 alters the virtual store inventory table 6000 by adding the fact that the article is purchased to the article identification information included in the table alteration information. Then, in step S209, the virtual store inventory management unit 62 refers to the virtual store inventory table 6000 for the inventory management information associated to the article identification information included in the table alteration information, and if the reservation/purchase flag is added to all pieces of inventory management information, displays the fact that the article is sold out on the display content of the virtual store associated to the article identification information included in the table alteration information.

Next, if the received table alteration information includes an instruction for adding article information to the virtual store inventory table 6000, in step S208, the virtual store inventory management unit 62 alters the virtual store inventory table 6000 by adding the article information included in the table alteration information to the virtual store inventory table 6000. Then, in step S209, the virtual store inventory management unit 62 refers to the received article information and the image table 6001, and displays the article image, the trade name, the price, and the inventory quantity in the virtual store. The inventory quantity is obtained by referring to the virtual store inventory table 6000 and counting the pieces of inventory management information identical to the inventory management information included in the added article information.

As described above, according to the present example embodiment, since the discount timing and discount information can be changed in accordance with environmental information, discount can be performed according to the situation of the day.

Modification

While the number of customers is used as environmental information in the third example embodiment, an event, the day of the week, or the weather may be used as environmental information. In a case where event information is environmental information, the discount change information table 7001 stores a date or a period as a discount change condition. For example, when inventory of unsold Christmas cakes need to be reduced, the discount change information table 7001 stores a discount change condition "December 25-December 26" and discount change information "additional 10% discount" in association with the article identification information of the Christmas cake. At this time, the physical store inventory management unit 72 determines whether the date satisfies the discount change condition in step S203, and if the date satisfies the discount change condition, acquires discount change information. While the discount change information table 7001 associates the discount change condition with the discount change information for each piece of article identification information, the discount change information table may be configured to associate only the discount change condition with the discount change information and apply to all articles.

In a case where the day of the week is environmental information, the day of the week such as Monday or Monday to Wednesday is stored as a discount change condition, for example. Specifically, when box lunches tend to remain unsold on the weekends, the discount change information table 7001 stores a discount change condition "Saturday-Sunday" and discount change information "advance discount timing by two hours" in association with the article identification information of the box lunch. At this time, the physical store inventory management unit 72 determines whether the day of the week satisfies the discount change condition in step S203, and if the day of the week satisfies the discount change condition, acquires discount change information.

In case where the weather is environmental information, sunny, rain, or the temperature is stored as a discount change condition, for example. Specifically, when croquettes tend to remain unsold on hot days, the discount change information table 7001 stores a discount change condition "temperature of 30 degrees or above" and discount change information "advance discount timing by two hours" in association with the article identification information of the croquette. At this time, the physical store inventory management unit 72 determines whether the weather of the day satisfies the discount change condition in step S203, and if the weather satisfies the discount change condition, acquires discount change information. The physical store inventory management unit 72 acquires weather information of the day from a site of the Japan Meteorological Agency on the Internet, for example. As described above, according to the present modification, discount can be performed according to an event, the day of the week, or the weather.

Fourth Example Embodiment

An information processing system according to a fourth example embodiment is different from the second example embodiment in that a physical store server is communicatively connected to a reader. Hereinafter, the same configurations as those of the second example embodiment are denoted by the same reference numerals, and description thereof will be omitted.

Figure 13:
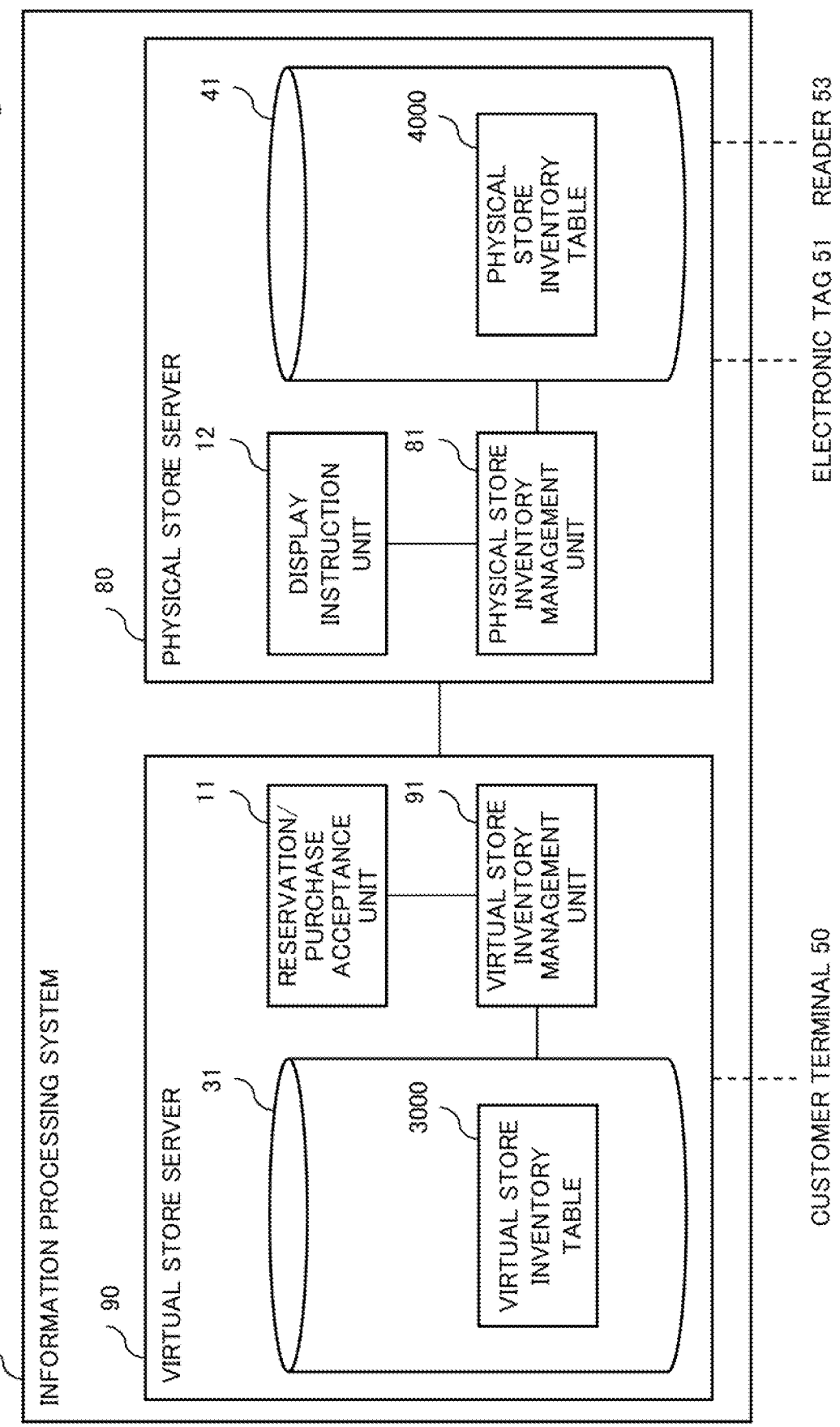
FIG. 13 is a functional block diagram showing an information processing system 5 according to a fourth example embodiment.

FIG. 13 is a functional block diagram showing an information processing system 5 according to the fourth example embodiment. The information processing system 5 includes a physical store server 80 and a virtual store server 90.

The physical store server 80 is communicatively connected to an electronic tag 51 and a reader 53, and includes a physical store table storage unit 41, a physical store inventory management unit 81, and a display instruction unit 12. When receiving article identification information from the reader 53, the physical store inventory management unit 81 alters a physical store inventory table 4000 by adding the fact that the article is reserved as a reservation/purchase flag to the corresponding article identification information in the physical store inventory table 4000. The physical store inventory management unit 81 also transmits, to a virtual store server 90, table alteration information including the article identification information received from the reader 53 and instructing addition of the fact that the article is reserved as a reservation/purchase flag to the article identification information in a virtual store inventory table 3000.

The reader 53 is installed in a storage body for storing an article that a customer of the physical store plans to purchase, and reads article identification information of the article that the customer plans to purchase. The storage body is a container used for carrying an article that a customer plans to purchase in a store, and is a shopping basket prepared in the physical store, for example. When reading the article identification information from the electronic tag 51, the reader 53 transmits the read article identification information to the physical store server 80. Specifically, the reader 53 is a bar code reader when a bar code associated to the article identification information is displayed on the electronic tag 51, and is an RFID reader when an RFID tag storing the article identification information is built into the electronic tag 51. In a case where the reader 53 is a bar code reader, the customer makes the reader 53 read the bar code when storing the article in the storage body.

The virtual store server 90 is communicatively connected to a customer terminal 50, and includes a reservation/purchase acceptance unit 11, a virtual store table storage unit 31, and a virtual store inventory management unit 91. The virtual store inventory management unit 91 manages inventory information to prevent a customer of the virtual store from reserving or purchasing an article associated to article identification information included in the table alteration information received from the physical store server 80. Specifically, the virtual store inventory management unit 91 adds the fact that the article is reserved as the reservation/purchase flag to the article identification information in the virtual store inventory table 3000 that matches the article identification information included in the table alteration information.

Operation of Information Processing System

Figure 14:
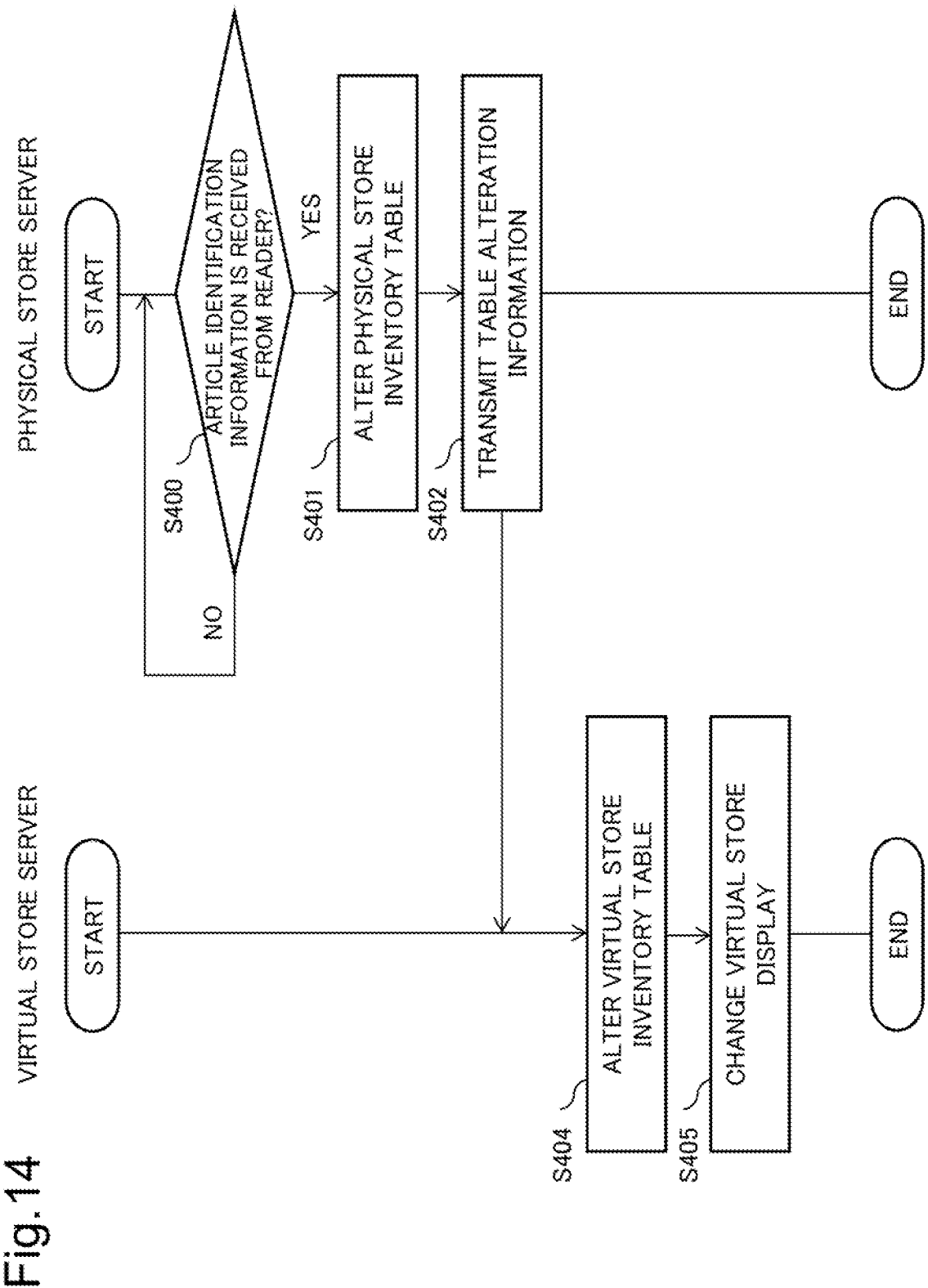
FIG. 14 is a diagram showing a flow of operations in the information processing system 5.

FIG. 14 is a diagram showing a flow of operations in the information processing system 5. In FIG. 14, the physical store server 80 waits until receiving article identification information from the reader 53 (No in step S400), and when reservation or purchase is accepted (Yes in step S400), the physical store inventory management unit 81 alters the physical store inventory table 4000 by adding the fact that the article is reserved as the reservation/purchase flag to the corresponding article identification information in the physical store inventory table 4000 (step S401), and transmits table update information to the virtual store server 30 (step S402).

The virtual store server 30 waits until receiving the table update information (No in step S403), and when the table alteration information is received (Yes in step S403), the virtual store inventory management unit 32 extracts the article identification information included in the table alteration information, and alters the virtual store inventory table 3000 by adding the fact that the article is reserved as the reservation/purchase flag to the article identification information in the virtual store inventory table 3000 matching the extracted article identification information (step S404). The virtual store inventory management unit 32 also refers to the virtual store inventory table 3000, and if the reservation/purchase flag is added to all pieces of article identification information matching the inventory management information of the article identification information added the fact that the article has been reserved, changes the display of the virtual store by displaying the fact that the article is sold out on the display content associated to the article identification information added the fact that the article has been reserved (step S405).

As described above, when a customer of the physical store stores an article in the storage body and the reader reads the article identification information of the electronic tag, the reservation/purchase flag is added to the associated article identification information in the virtual store inventory table. Hence, since the article stored in the storage body by the customer of the physical store cannot be reserved or purchased in the virtual store, the article stored in the storage body in the physical store can be prevented from being reserved or purchased by a customer of the virtual store.

The first to fourth example embodiments may be combined as appropriate without departing from the technical concept of the present disclosure.

Some or all of the above example embodiments may be described as in the following supplementary notes, but are not limited to the following.

Supplementary Note 1

An information processing system including
at least one server that manages inventory possessed by a virtual store and a physical store, in which
the server
manages the inventory by using article identification information capable of uniquely identifying an article, and includes
a reservation/purchase acceptance unit that accepts reservation or purchase of the article from a customer terminal and acquires article identification information of the article for which the reservation or purchase has been accepted, and
a display instruction unit that causes the fact that the article is reserved or purchased to be displayed on an electronic tag attached to an article displayed in the physical store and associated to the acquired article identification information.

Supplementary Note 2

The information processing system described in Supplementary Note 1, in which:
the server includes
a physical store inventory management unit that manages discount information indicating a discount price or a discount rate and a discount timing for each piece of article identification information, and
a virtual store inventory management unit that manages an article to be displayed in the virtual store and discount information to be displayed in the virtual store;
the physical store inventory management unit notifies the display instruction unit and the virtual store inventory management unit of associated article identification information and discount information when a discount timing comes;
the display instruction unit causes the discount information to be displayed on an electronic tag associated to the notified article identification information; and
the virtual store inventory management unit changes information displayed in the virtual store in accordance with the notified article identification information and the discount information.

Supplementary Note 3

The information processing system described in Supplementary Note 2, in which
the physical store inventory management unit manages the discount timing and the discount information for each piece of article identification information in accordance with environmental information indicating the environment inside and outside the physical store.

Supplementary Note 4

The information processing system described in Supplementary Note 3, in which
in a case where the environmental information is the number of customers,
when the number of customers of the day is smaller than the number of customers in the past, the physical store inventory management unit changes the discount timing or the discount information.

Supplementary Note 5

The information processing system described in Supplementary Note 3 or 4, in which
the physical store inventory management unit changes the discount information or the discount timing by using information of an event, the day of the week, or the weather as environmental information.

Supplementary Note 6

The information processing system described in any one of Supplementary Note 2 to 5, in which the physical store inventory management unit transmits the article identification information received from a reader for reading article identification information of an article that a customer plans to purchase to the virtual store inventory management unit, and the virtual store inventory management unit manages inventory information to prevent a customer of the virtual store from reserving or purchasing an article associated to the received article identification information.

Supplementary Note 7

An information processing device that manages inventory possessed by a virtual store and a physical store using article identification information capable of uniquely identifying an article, the information processing device including a reservation/purchase acceptance unit that accepts reservation or purchase of the article from a customer terminal and acquires article identification information of the article for which the reservation or purchase has been accepted, and a display instruction unit that causes the fact that the article is reserved or purchased to be displayed on an electronic tag attached to an article displayed in the physical store and associated to the acquired article identification information.

Supplementary Note 8

An information processing method applied to an information processing system including at least one server that manages inventory possessed by a virtual store and a physical store, the method including the server managing the inventory by using article identification information capable of uniquely identifying an article, accepting reservation or purchase of the article from a customer terminal and acquiring article identification information of the article for which the reservation or purchase has been accepted, and causing the fact that the article is reserved or purchased to be displayed on an electronic tag attached to an article displayed in the physical store and associated to the acquired article identification information.

Supplementary Note 9

A program for causing a computer implementing at least one server that manages inventory possessed by a virtual store and a physical store to run:

processing of managing the inventory by using article identification information capable of uniquely identifying an article;

processing of accepting reservation or purchase of the article from a customer terminal and acquiring article identification information of the article for which the reservation or purchase has been accepted; and processing of causing the fact that the article is reserved or purchased to be displayed on an electronic tag attached to an article displayed in the physical store and associated to the acquired article identification information.

The above example embodiments have been described as model examples, but the present invention is not limited to the above embodiments. That is, the present example embodiment can be applied to various modes that can be understood by a person skilled in the art.

This application is based upon and claims the benefit of priority from Japanese patent application No. 2018-180808, filed on Sep. 26, 2018, the disclosure of which is incorporated herein in its entirety by reference.

REFERENCE SIGNS LIST 1, 2, 3, 4, 5 information processing system
10 server
30, 60, 90 virtual store server
11 reservation/purchase acceptance unit
40, 70, 80 physical store server
12 display instruction unit
50 customer terminal
51 electronic tag
52 store clerk terminal
31, 61 virtual store table storage unit
3000, 6000 virtual store inventory table
6001 image table
32, 62, 91 virtual store inventory management unit
41, 71 physical store table storage unit
4000, 7000 physical store inventory table
7001 discount change information table
42, 72, 81 physical store inventory management unit
53 reader
33, 43 bus
34, 44 CPU
35, 45 memory
36, 46 storage device
37, 47 input/output interface
38, 48 network interface

What is claimed is:

1. An information processing system comprising:
at least one server that manages inventory possessed by a virtual store and a physical store, wherein
the server manages the inventory by using article identification information uniquely identifying an article, and includes
a memory configured to store instructions; and
at least one processor configured to execute the instructions to:
accept reservation or purchase of the article from a customer terminal and acquire the article identification information of the article for which the reservation or purchase has been accepted;
cause an indication that the article is reserved or purchased to be displayed on an electronic tag attached to the article displayed in the physical store and associated with the acquired article identification information;
manage discount information indicating a discount price or a discount rate and a discount timing for the article identification information in accordance with environmental information as to an environment inside or outside the physical store, wherein
the discount timing specifies when the article is to be sold at the discount price or the discount price, and
the environmental information comprises one or more of a number of customers inside the physical store, a day of the week, and weather outside the store;
determine the environment inside or outside the store;
change the discount price or the discount rate based on the environment inside or outside the physical store as has been determined;
monitor whether the discount timing has arrived;

upon the monitoring having identified that the discounting timing has arrived, cause the discount information to be displayed on the electronic tag attached to the article, and change information displayed in the virtual store for the article in accordance with the discount information.

2. The information processing system according to claim 1, wherein the at least one processor is configured to execute the instructions to
in a case where the environmental information is a number of customers,
when the number of customers is smaller than the number of customers in the past, change the discount timing or the discount information.

3. The information processing system according to claim 1, wherein the at least one processor is configured to execute the instructions to
change the discount information or the discount timing by using information of an event, a day of the week, or weather as the environmental information.

4. The information processing system according to claim 1, wherein the at least one processor is configured to execute the instructions to:
transmit the article identification information received from a reader for reading the article identification information of the article that a customer plans to purchase, and
manage inventory information to prevent a customer of the virtual store from reserving or purchasing the article associated with the received article identification information.

5. An information processing device that manages inventory possessed by a virtual store and a physical store using article identification information uniquely identifying an article, the information processing device comprising:
a memory configured to store instructions; and
at least one processor configured to execute the instructions to:
accept reservation or purchase of the article from a customer terminal and acquire the article identification information of the article for which the reservation or purchase has been accepted;
cause an indication that the article is reserved or purchased to be displayed on an electronic tag attached to the article displayed in the physical store and associated with the acquired article identification information;
manage discount information indicating a discount price or a discount rate and a discount timing for the article identification information in accordance with environmental information as to an environment inside or outside the physical store, wherein
the discount timing specifies when the article is to be sold at the discount price or the discount price, and
the environmental information comprises one or more of a number of customers inside the physical store, a day of the week, and weather outside the store;
determine the environment inside or outside the store;
change the discount price or the discount rate based on the environment inside or outside the physical store as has been determined;
monitor whether the discount timing has arrived;
upon the monitoring having identified that the discounting timing has arrived, cause the discount information to be displayed on the electronic tag attached to the article, and change information displayed in the virtual store for the article in accordance with the discount information.

6. An information processing method to performed by an information processing system including at least one server that manages inventory possessed by a virtual store and a physical store,
the server
managing the inventory by using article identification information uniquely identifying an article, the method comprising:
accept reservation or purchase of the article from a customer terminal and acquire the article identification information of the article for which the reservation or purchase has been accepted;
causing an indication that the article is reserved or purchased to be displayed on an electronic tag attached to the article displayed in the physical store and associated with the acquired article identification information;
managing discount information indicating a discount price or a discount rate and a discount timing for the article identification information in accordance with environmental information as to an environment inside or outside the physical store, wherein
the discount timing specifies when the article is to be sold at the discount price or the discount price, and
the environmental information comprises one or more of a number of customers inside the physical store, a day of the week, and weather outside the store;
determining the environment inside or outside the store;
changing the discount price or the discount rate based on the environment inside or outside the physical store as has been determined;
monitoring whether the discount timing has arrived;
upon the monitoring having identified that the discounting timing has arrived, causing the discount information to be displayed on the electronic tag attached to the article, and changing information displayed in the virtual store for the article in accordance with the discount information.

\* \* \* \* \*